United States Patent
Ohira et al.

(10) Patent No.: US 7,478,697 B2
(45) Date of Patent: Jan. 20, 2009

(54) STRADDLE TYPE VEHICLE

(75) Inventors: Masaru Ohira, Shizuoka (JP); Yasuharu Sakashita, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 426 days.

(21) Appl. No.: 11/332,842

(22) Filed: Jan. 13, 2006

(65) Prior Publication Data
US 2006/0169513 A1 Aug. 3, 2006

(30) Foreign Application Priority Data
Feb. 2, 2005 (JP) ............................. 2005-025876

(51) Int. Cl.
*B62K 11/00* (2006.01)

(52) U.S. Cl. ................... 180/219; 180/68.1; 180/68.2; 180/229; 180/296; 180/903; 280/291

(58) Field of Classification Search .............. 180/68.1, 180/68.2, 219, 229, 296, 903; 280/291
See application file for complete search history.

(56) References Cited

U.S. PATENT DOCUMENTS

| 4,742,884 A * | 5/1988 | Ishikawa ................... 180/219 |
| 4,800,980 A * | 1/1989 | Hideo et al. ............... 180/225 |
| 6,173,983 B1 * | 1/2001 | Moore ........................ 280/291 |
| 7,004,276 B2 * | 2/2006 | Iizuka et al. .............. 180/89.17 |
| 7,111,375 B2 * | 9/2006 | Buckhouse et al. ........... 29/428 |
| 2002/0007977 A1 * | 1/2002 | Ishii et al. .................... 180/219 |
| 2002/0066611 A1 * | 6/2002 | Lane et al. ................... 180/228 |
| 2005/0155804 A1 * | 7/2005 | Kamemizu et al. .......... 180/219 |

FOREIGN PATENT DOCUMENTS

| DE | 196 08 177 | 3/1996 |
| EP | 1 514 785 | 3/2005 |
| JP | 04-138990 | 5/1992 |
| JP | 05-065086 | 3/1993 |
| JP | 11-198885 | 7/1999 |
| JP | 2003-335284 | 11/2003 |

* cited by examiner

*Primary Examiner*—Paul N Dickson
*Assistant Examiner*—Jacob Knutson
(74) *Attorney, Agent, or Firm*—Hogan & Hartson LLP

(57) ABSTRACT

A scooter type motorcycle capable of improving cooling efficiency of brake calipers includes a vehicle body cover, covering a rear wheel brake device, is formed with a drive-induced airflow introducing port. A drive-induced airflow guiding duct, supported with vehicle body frames, for guiding drive-induced airflow from the drive-induced airflow introducing port to the brake calipers of the rear wheel brake device, is provided. The drive-induced airflow guiding duct has an inflow port formed at its one end for the drive-induced airflow entering at the drive-induced airflow introducing port to flow in. An airflow delivery port is formed at its other end and opening in the vicinity of the brake calipers for delivering the drive-induced airflow, introduced through the inflow port, to the brake calipers.

11 Claims, 7 Drawing Sheets

STRADDLE TYPE VEHICLE

BACKGROUND OF THE INVENTION

1. Field of the Invention

This invention relates to a straddle-type vehicle having a cooling structure of a rear wheel brake device that applies brake with fluid pressure of brake fluid.

2. Description of Related Art

In a straddle-type vehicle such as a motorcycle, a disk brake is conventionally used because, for example, the brake force is easy to control, and the cooling efficiency is good as the brake calipers and the disk are exposed outside, so that drive-induced airflow strikes them directly.

However, as for a scooter type motorcycle with its disk brake covered with a vehicle body cover, the drive-induced airflow is less likely to directly strike the brake calipers and the disk, possibly resulting in poor cooling efficiency. Therefore, it is preferable to provide a drive-induced airflow introducing port in the vehicle body cover to introduce drive-induced airflow to the brake calipers and others to improve cooling efficiency.

A scooter type motorcycle with a rear wheel brake device is described in Japanese Patent Document JP-B-3010221. In page 4, lines 15-24, JP-B-3010221 discloses a drive-induced airflow introducing port formed in a position on the vehicle body cover, in front of the rear wheel brake device, and beside the front part of the engine unit. The vehicle body cover is further formed with a recess receding toward the inside of the vehicle body in a position in front of the drive-induced airflow introducing port to be continuous to the drive-induced airflow introducing port. An airflow introducing member is provided that is continuous from the recess inside the vehicle body cover, along the underline of the vehicle body cover, extending toward the rear of the vehicle body in a straight line in side view, to form an airflow moving passage together with the inside face of the vehicle body cover for guiding the drive-induced airflow from the drive-induced airflow introducing port to the calipers of the rear wheel brake device.

Further, in page 3, line 50 to page 4, line 15, JP-B-3010221 states that the side portion of the side cover is made so that the drive-induced airflow guided from the recess continuing to the drive-induced airflow introducing port flows to the airflow guiding member that guides the drive-induced airflow to the inside of the rear cover in cooperation with the inside surface of the rear cover.

According to the above, in page 4, lines 24-29, JP-B-3010221 states that it is possible to cool the calipers of the rear wheel brake device by utilizing the drive-induced airflow. Moreover, the drive-induced airflow can be guided smoothly to the calipers without bending largely. Further, the airflow guiding member makes it possible to guide the cold drive-induced airflow directly to and cool the calipers without picking up heat of the engine.

However, according to JP-B-3010221, in the case it is intended to blow a larger volume of drive-induced airflow to the brake calipers through the airflow guiding member (drive-induced airflow guiding duct), it is necessary to form a large airflow guiding member, increase sheet thickness of the rear cover (vehicle body cover) to support the airflow guiding member, and use a component of higher strength and larger size for joining it. Therefore, the structure is highly complex, and the number of mechanical parts is increased.

Further, the cooling efficiency of the brake calipers is considered to improve if the guide-out port of the airflow guiding member is provided in a position nearer to the brake calipers.

Because no obstacle to drive-induced airflow is present in the area below the footrest on which the rider's foot is placed and no turbulence in drive-induced airflow occurs there, it is considered that cooling efficiency is improved by forming the drive-induced airflow introducing port below the footrest to cool the brake calipers with the turbulence-free, drive-induced airflow, rather than forming the drive-induced airflow introducing port in a position in front of the rear wheel brake device, beside the front part of the engine unit.

SUMMARY OF THE INVENTION

Therefore, an object of this invention is to provide a scooter type motorcycle capable of directly blowing a large volume of drive-induced airflow to the brake calipers and improve cooling efficiency.

Another object of this invention is to provide a scooter type motorcycle having a cooling mechanism of the brake calipers in a simple structure by using a smaller number of mechanical parts.

Still another object of this invention is to provide a scooter type motorcycle having a rear wheel brake cooling device that improves the cooling efficiency of the brake calipers by locating the airflow delivery port of a drive-induced airflow guiding duct for supplying airflow to the brake calipers in the vicinity of the brake calipers.

Still another object of this invention is to provide a scooter type motorcycle having a rear wheel brake cooling device that cools the brake calipers by drive-induced airflow free from turbulence.

In one embodiment, to accomplish the above objects, the invention comprises a straddle-type vehicle having a vehicle body frame, a rear wheel, a rear wheel brake device having brake calipers for the rear wheel, and a vehicle body cover surrounding the rear wheel brake device. A drive-induced airflow introducing port is formed in the vehicle body cover. A drive-induced airflow guiding duct is provided as supported with the vehicle body frame to guide the drive-induced airflow from the drive-induced airflow introducing port to the brake calipers of the rear wheel brake device. The drive-induced airflow guiding duct has an inflow port formed on its one end for the drive-induced airflow entering through the drive-induced airflow introducing port to flow in. An airflow delivery port formed on its other end and opening in the vicinity of the brake calipers to deliver the drive-induced airflow introduced in through the inflow port to the brake calipers.

In one aspect, the drive-induced airflow guiding duct is made up of a front duct formed with the inflow port, and a rear duct formed with the airflow delivery port.

In another aspect, a footrest is provided in front of the drive-induced airflow guiding duct, and the drive-induced airflow introducing port is provided below the footrest.

In another aspect, the footrest has, in its rear part, a tandem footrest portion located above its front part, and the vehicle body cover is provided with the drive-induced airflow introducing port in a position below the tandem footrest.

In another aspect, the vehicle body cover is made up of a cosmetic side cover formed with the drive-induced airflow introducing port and a rear wheel side cover for covering the rear wheel brake device. The drive-induced airflow guiding duct is attached to the vehicle body frame so as to straddle the cosmetic side cover and the rear wheel side cover for covering the rear wheel brake device.

In another aspect, a muffler is provided in the vicinity of the brake calipers, and the airflow delivery port is open toward the muffler and the brake calipers.

In another aspect, the airflow delivery port is open toward the underside of the vehicle body.

In another aspect, the brake calipers and the muffler are placed superposed in both vertical direction and vehicle width direction.

In another aspect, the drive-induced airflow guiding duct is secured to the vehicle body frame through a front part bracket and a rear part bracket placed in the front and rear parts of the drive-induced airflow guiding duct.

In another aspect, the front duct is attached to the front part bracket, and the rear duct is attached to the rear part bracket.

In another aspect, the front part bracket is a footrest bracket for supporting the footrest.

Since the drive-induced airflow guiding duct is supported with the vehicle body frame, the weight of the drive-induced airflow guiding duct is not put on the vehicle body cover. Therefore, supporting strength is secured without increasing the sheet thickness of the vehicle body cover.

Further, an inflow port for the drive-induced airflow, entering through the drive-induced airflow introducing port to flow in, is formed on one end of the drive-induced airflow guiding duct. An airflow delivery port opening in the vicinity of the brake calipers, for delivering the drive-induced airflow introduced in through the inflow port to the brake calipers, is formed on the other end of the drive-induced airflow guiding duct. Therefore, the drive-induced airflow introduced through the drive-induced airflow introducing port passes from the inflow port through the inside of the drive-induced airflow guiding duct and is delivered through the airflow delivery port. Therefore, it is possible to cast a larger volume of drive-induced airflow to the brake calipers and improve cooling efficiency of the brake calipers.

Since the drive-induced airflow guiding duct is made up of the front duct formed with the inflow port and the rear duct formed with the airflow delivery port, it is possible to place the inflow port and the airflow delivery port in positions favorable for guiding the drive-induced airflow by adjusting the connection state of the front duct and the rear duct.

Since the drive-induced airflow introducing port is provided below the footrest, the drive-induced airflow is not disturbed, as it does not strike the rider's leg. Because the brake calipers are cooled with the drive-induced airflow free from turbulence, it is possible to improve cooling efficiency of the brake calipers.

Since the footrest has, in its rear part, a tandem footrest portion located above its front part, and the vehicle body cover is provided with the drive-induced airflow introducing port in a position below the tandem footrest, it is possible to make wide the opening of the inflow port of the drive-induced airflow guiding duct and smoothly guide the air flowing below the footrests to the inflow port.

Since the vehicle body cover is made up of the cosmetic side cover formed with the drive-induced airflow introducing port, and the rear wheel side cover for covering the rear wheel brake device, the vehicle body cover need not be formed as a single part elongate in fore-and-aft direction, but may be made in two separate parts in a favorable way for forming.

Since the drive-induced airflow guiding duct is attached to the vehicle body frame in the state of straddling the cosmetic side cover and the rear wheel side cover, it is unnecessary to consider connection displacement of the duct due to mating surface displacement of the two, front and rear parts.

Since the muffler is provided in the vicinity of the brake calipers, and the airflow delivery port is open toward the muffler and the brake calipers, it is possible to cool not only the brake calipers but also the muffler with the drive-induced airflow.

Since the airflow delivery port is open toward the underside of the vehicle body, it is possible to let hot air, after cooling the brake calipers and the muffler, flow smoothly from the underside of the vehicle body to the outside.

Since the brake calipers and the muffler are placed in superposition in both vehicle width direction and vertical direction, it is possible to maintain cooling performance without increasing the vehicle width.

Since the front part bracket and the rear part bracket placed in front and rear parts of the drive-induced airflow guiding duct, it is possible to support the weight of the drive-induced airflow guiding duct elongate in fore-and-aft direction with the vehicle body frame in good balance.

The front duct is attached to the front part bracket, and the rear duct is attached to the rear part bracket. Therefore, the weight of the front duct and the weight of the rear duct are supported as distributed on the front part bracket, the rear part bracket, and the vehicle body frame. Therefore, it is possible to avoid all the weight from concentrating on a single member and make supporting members less likely to deteriorate.

Since the front part bracket is the footrest bracket for supporting the footrest, the single part can be commonly used for two purposes.

DETAILED DESCRIPTION OF THE INVENTION

An embodiment of this invention is described below in reference to FIGS. 1 to 7.

Figure 1:
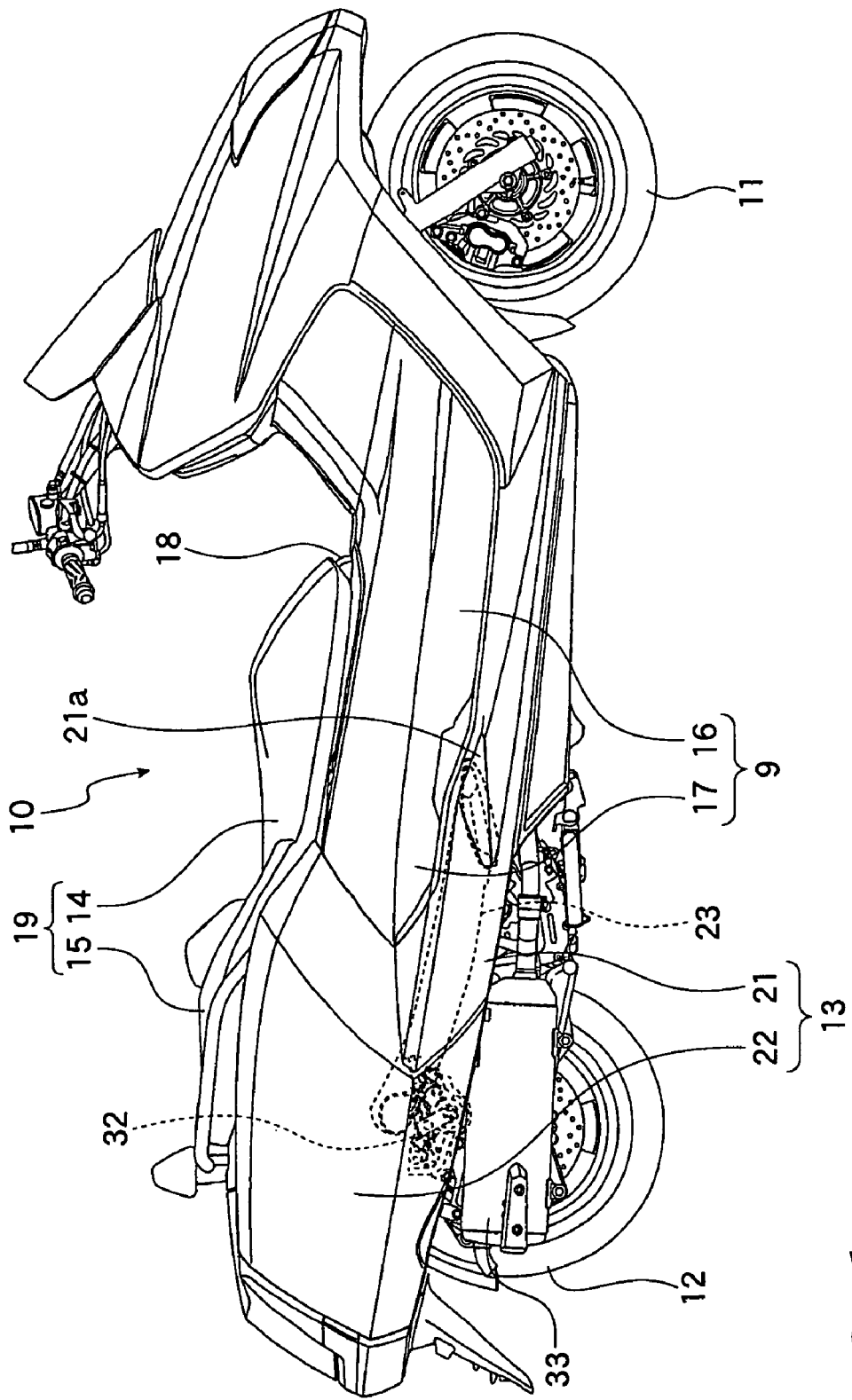
FIG. 1 is a side view of a scooter type motorcycle related to an embodiment of the invention.

FIG. 1 shows a scooter type motorcycle 10 as a straddle-type vehicle. The entire vehicle body from the front part of the vehicle on the front wheel 11 side to the rear part of the vehicle on the rear wheel 12 side is covered with a vehicle body cover 13. The vehicle is also provided with: a main seat 14 and a tandem seat 15, a footrest board 9 or foot-placing part for riders on the seats 14 and 15, with a main footrest portion 16 located in the front portion, and a tandem footrest portion 17 in the rear portion on both vehicle side portions of the vehicle body cover 13.

The side of the rear wheel brake device 8 (See FIG. 7) having brake calipers 32 for the rear wheel 12 is covered as shown in FIG. 1 with a vehicle body cover 13.

The main seat 14 and the tandem seat 15 are made into a single seat 19 of an open-close type that can be opened and closed about a hinge 18 provided at the front end of the main seat 14 by lifting and lowering the rear part of the tandem seat 15.

The scooter type motorcycle 10 has the footrest board 9. Cosmetic side cover 21 comprising part of the vehicle body cover 13 is attached to the lower edge of the footrest board 9. A rear wheel side cover 22 comprising part of the vehicle body cover 13 is attached adjacent to the rear part of the cosmetic side cover 21.

Figure 2:
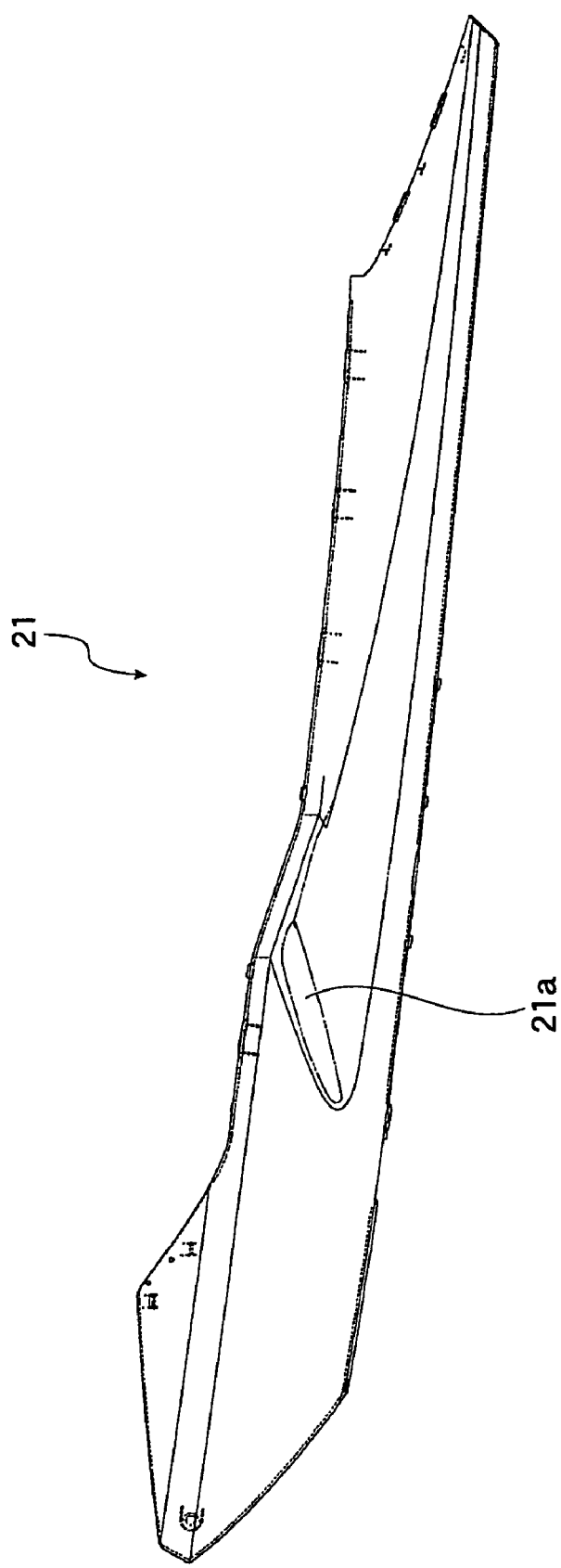
FIG. 2 is an enlarged oblique view of a cosmetic side cover attached to the scooter type motorcycle related to the embodiment of FIG. 1.

The cosmetic side cover 21, as shown in FIGS. 1 and 2, has, in its approximate center, a drive-induced airflow introducing port 21a so that drive-induced airflow flows in smoothly through the drive-induced airflow introducing port 21a when the scooter type motorcycle 10 is driven. The drive-induced airflow introducing port 21a is provided below the tandem footrest portion 17 comprising the footrest board 9. The footrest board 9 has in its front side portion the main footrest portion 16 or a portion for placing the driver's foot on, and in its rear side portion the tandem footrest portion 17 or a portion for placing the rear rider's foot on. The tandem footrest portion 17 is located above the main footrest portion 16. The drive-induced airflow introducing port 21a is provided below the tandem footrest portion 17 on the vehicle body cover 13.

Figure 3:
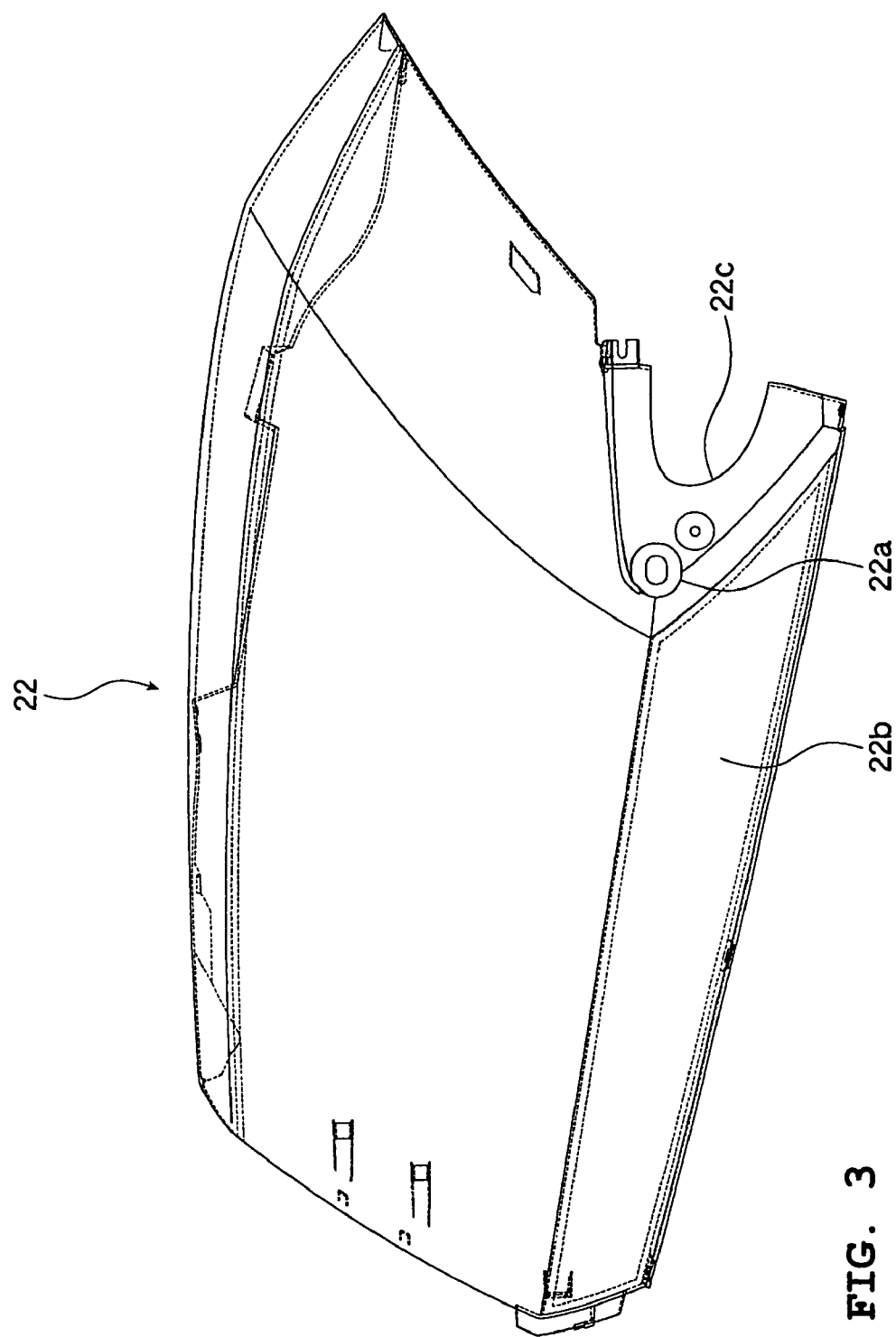
FIG. 3 is an enlarged oblique view of a rear wheel side cover attached to the scooter type motorcycle related to the embodiment of FIG. 1.

The rear wheel side covers 22, as shown in FIG. 3, is formed with a joining portion 22a for attaching the cosmetic side covers 21, curved in V-shape in cross section, to protect the brake device 8, an air cleaner, and a belt chamber (not shown).

A drive-induced airflow guiding duct 23 (See FIG. 1), is provided inside the length between the cosmetic side cover 21 and the underside portion 22b of the rear wheel side cover 22. Therefore, the rear wheel side cover 22 is provided with a cut 22c for admitting the drive-induced airflow guiding duct 23.

Figure 4:
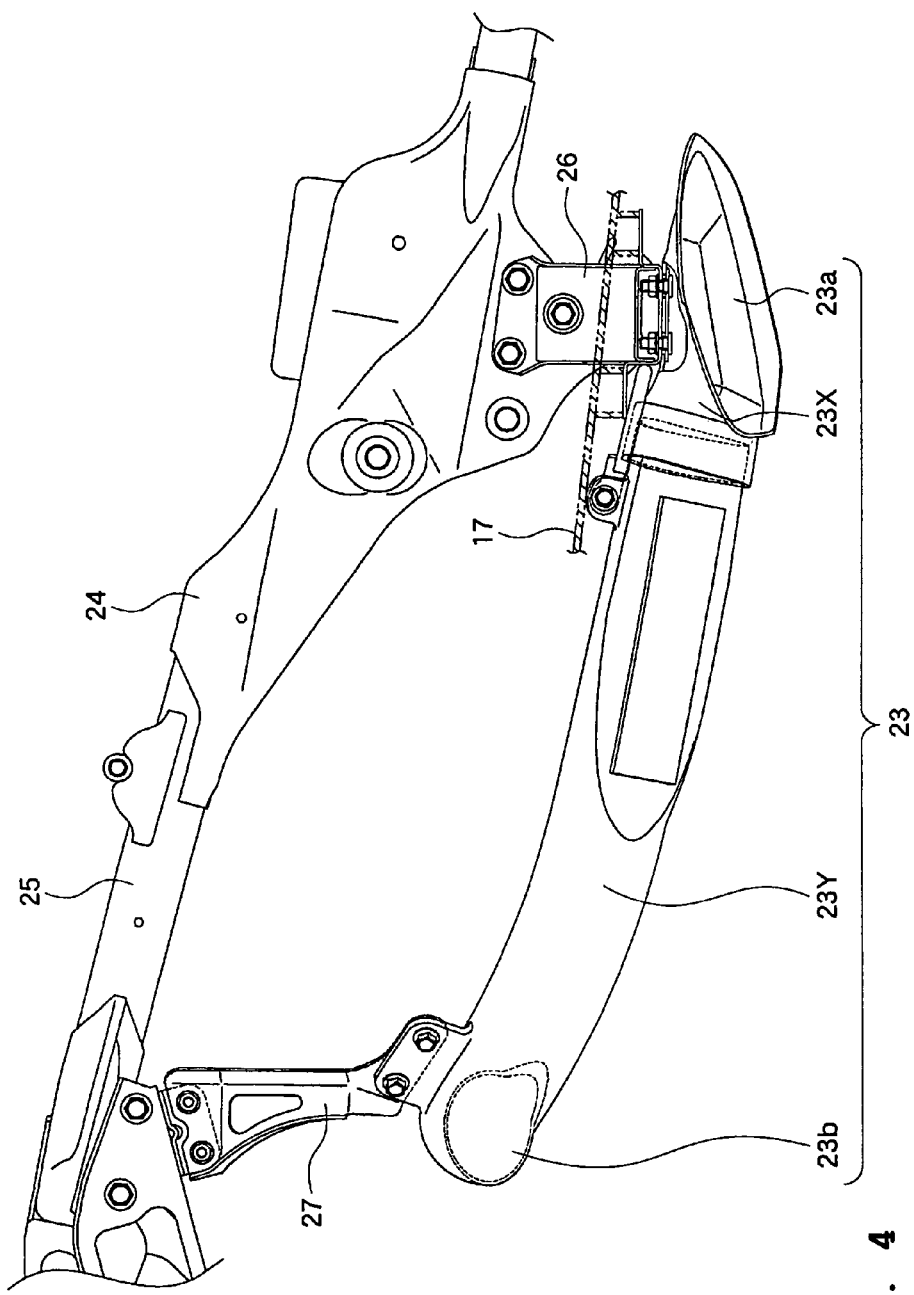
FIG. 4 is an enlarged view showing the relationship between the drive-induced airflow guiding duct, the engine bracket, and the seat rail, related to the same embodiment.

The drive-induced airflow guiding duct 23, as shown in FIG. 4, is supported with an engine bracket 24 and a seat rail 25 or the vehicle body frame to guide the drive-induced airflow from the drive-induced airflow introducing port 21a to the brake calipers 32 of the rear wheel brake device 8, which will be described later.

The drive-induced airflow guiding duct 23 is made up of the front duct 23X formed with an inflow port 23a for the drive-induced airflow entering through the drive-induced airflow introducing port 21a to flow in, and the rear duct 23Y formed with an airflow delivery port 23b for delivering the drive-induced airflow, guided from the inflow port 23a, to the brake calipers 32. The rear end of the front duct 23X is fit to the front end of the rear duct 23Y.

The front duct 23X is attached to a footrest bracket 26, comprising a front bracket, for supporting the footrest board 9, and its upper end is secured to the engine bracket 24 through the footrest bracket 26. The rear upper end of the rear duct 23Y is secured to a seat rail 25 through a stay 27, comprising a rear bracket.

The vehicle body cover 13, having the cosmetic side cover 21 formed with the drive-induced airflow introducing port 21a and the rear wheel side cover 22 covering the rear wheel brake device 8, is attached so as to cover the drive-induced airflow guiding duct 23, the engine bracket 24, and the seat rail 25. Therefore, the drive-induced airflow guiding duct 23 results in being attached to the engine bracket 24 and the seat rail 25, straddling the cosmetic side cover 21 and the rear wheel side cover 22.

The drive-induced airflow guiding duct 23 is placed, as shown in FIGS. 1 and 4, with the airflow delivery port 23b located above the inflow port 23a, sloping up from the inflow port 23a to the airflow delivery port 23b, so that any rubbish or the like entering through the inflow port 23a is not discharged out of the airflow delivery port 23b.

Figure 5:
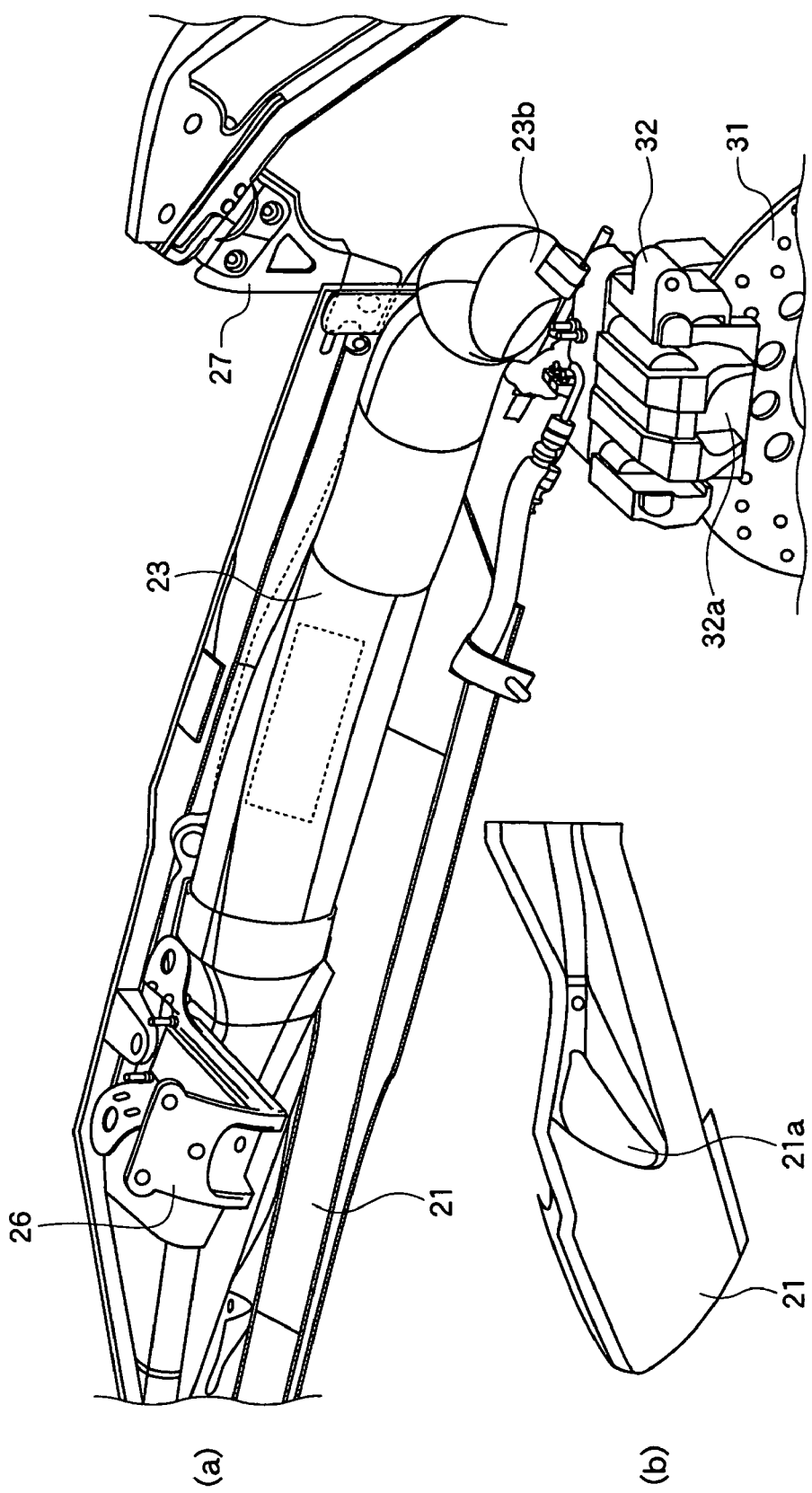
FIG. 5 is an enlarged view showing the relationship between the drive-induced airflow guiding duct, the vehicle body cover, and the brake calipers, related to the embodiment of FIG. 1.
Figure 6:
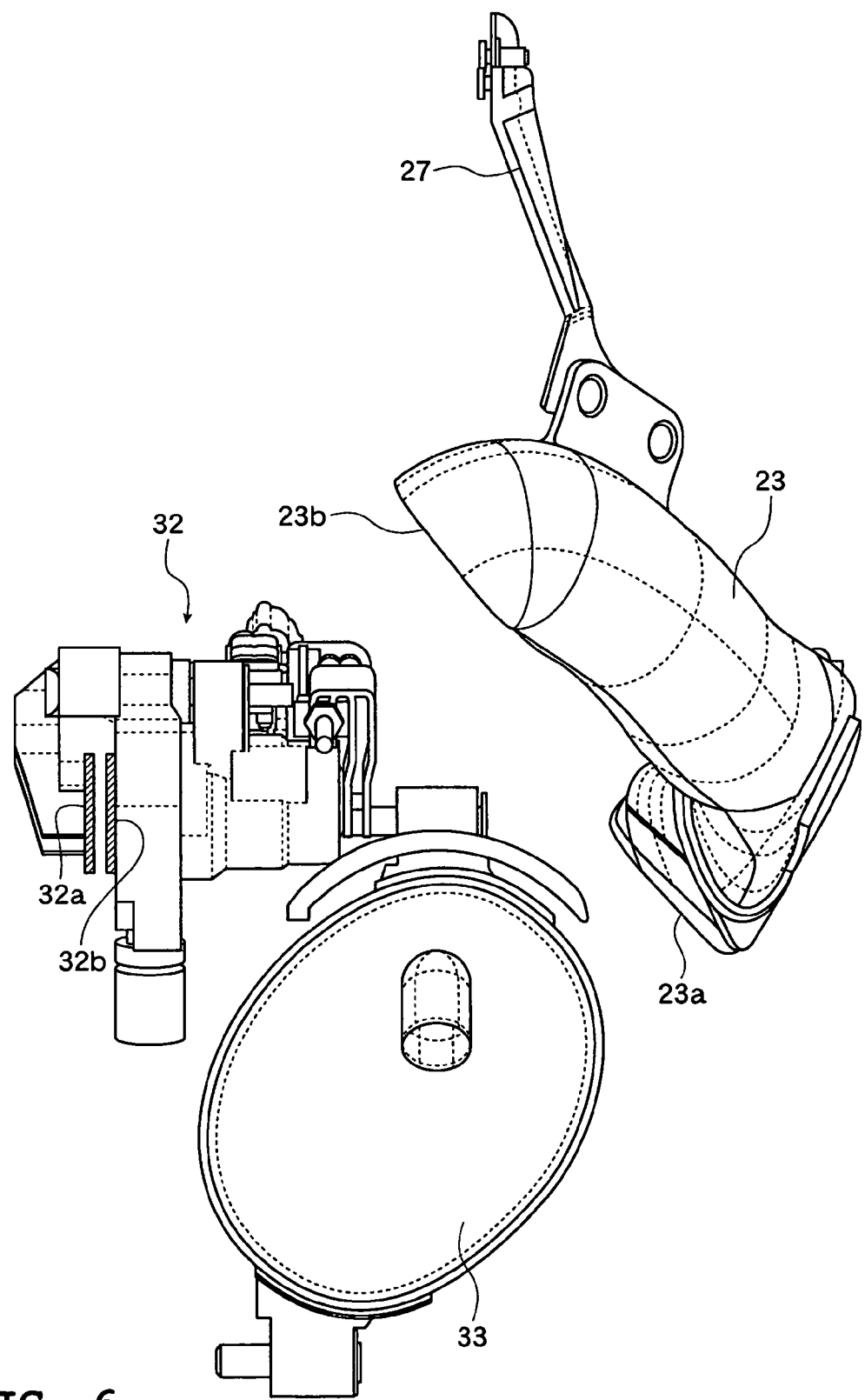
FIG. 6 is an enlarged view showing the relationship between the drive-induced airflow guiding duct, the brake calipers, and the muffler, related to the embodiment of FIG. 1.

The airflow delivery port 23b is placed, as shown in FIGS. 5 and 6, to be open downward between a muffler 33 placed in the vicinity of the rear wheel brake device 8 and the brake calipers 32, a component of the rear wheel brake device 8. Also, the airflow delivery port 23b is constituted so that the brake calipers 32 and the muffler 33 both are cooled with the drive-induced airflow. The drive-induced airflow drawn in through the drive-induced airflow introducing port 21a flows from the inflow port 23a and passes through inside the drive-induced airflow guiding duct 23 and is delivered out of the airflow delivery port 23b. As shown in FIG. 6, because the brake calipers 32 and the muffler 33 are placed one over the other in the vertical direction, and the drive-induced airflow guiding duct 23 is placed by the side of those components, the vehicle body is made in a slim constitution.

In other words, the muffler 33 is placed on the right down side of the brake calipers 32. The drive-induced airflow guiding duct 23 is placed on the right up side of the brake calipers 32. Because the calipers 32, the muffler 33, and the duct 33 are not placed in a lateral row, and so do not take up much space laterally, the vehicle body can avoid widening in the vehicle width direction.

The drive-induced airflow guiding duct 23 is formed, as shown in FIG. 5, with the airflow delivery port 23b bent inward and downward. The airflow delivery port 23b is constituted to be directed downward to cool from above the brake calipers 32 and the muffler 33. The brake calipers 32, for controlling a disk plate 31 of the rear wheel 12, are placed opposite the airflow delivery port 23b.

Figure 7:
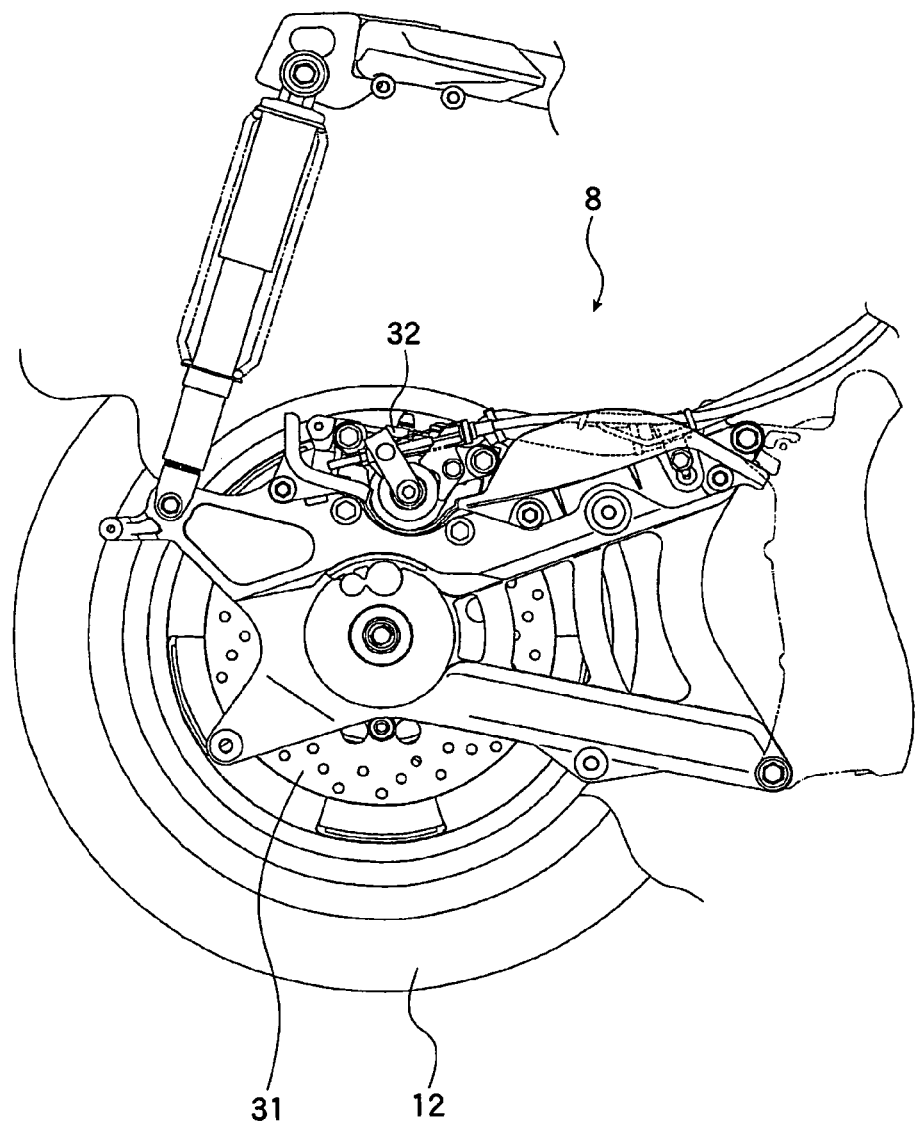
FIG. 7 is an enlarged side view of the scooter type motorcycle showing the rear wheel and the brake device, related to the embodiment of FIG. 1.

As shown in FIGS. 6 and 7, the brake calipers 32 are provided with brake pads 32a and 32b. When a piston (not shown) is pushed out by hydraulic pressure, the brake pads 32a and 32b are pressed against the disk plate 31 (See FIG. 5). As the brake calipers 32 move sideways with the reaction force of the pressing, the brake pads 32a and 32b located inside are pressed against the disk plate 31. In this way, brake is applied.

Next, the manner of drive-induced airflow flow in the scooter type motorcycle 10, as an embodiment of this invention is described.

When the scooter type motorcycle 10 is driving, drive-induced airflow enters at the drive-induced airflow introducing port 21a, flows from the inflow port 23a through the inside of the drive-induced airflow guiding duct 23 connected to the drive-induced airflow introducing port 21a, and flows out of the airflow delivery port 23b toward between the brake calipers 32 and the muffler 33.

With such a scooter type motorcycle 10, because the drive-induced airflow guiding duct 23 is supported with both the engine bracket 24 and the seat rail 25, the weight of the drive-induced airflow guiding duct 23 is not put on the cosmetic side cover 21 and the rear wheel side cover 22, so that the support strength of the cosmetic side cover 21 and the rear wheel side cover 22 is secured without increasing their sheet thickness.

The inflow port 23a for the drive-induced airflow entering through the drive-induced airflow introducing port 21a to flow in is formed at one end of the drive-induced airflow guiding duct 23. The airflow delivery port 23b opening in the vicinity of the brake calipers 32 for delivering the drive-induced airflow introduced through the inflow port 23a to the brake calipers 32 is formed at the other end of the drive-induced airflow guiding duct 23. Therefore, the drive-induced airflow introduced through the inflow port 23 passes through the inflow port 23a of the drive-induced airflow guiding duct 23 and through its inside, and is delivered out of the airflow delivery port 23b. Therefore, it is possible to cast a large volume of drive-induced airflow directly to the brake calipers 32 and improve the cooling efficiency of the brake calipers 32.

Further, because the drive-induced airflow guiding duct 23 is made up of the front duct 23X formed with the inflow port 23a and the rear duct 23Y formed with the airflow delivery port 23b, it is possible to place the inflow port 23a and the airflow delivery port 23b of the drive-induced airflow guiding duct 23 in favorable positions for guiding the drive-induced airflow by adjusting connection state of the front duct 23X and the rear duct 23Y.

Further, in case one of the front duct 23X and the rear duct 23Y is damaged, the drive-induced airflow guiding duct 23 may be repaired by replacing the damaged one of the front duct 23X and the rear duct 23Y. Further, since the front duct 23X and the rear duct 23Y are freely attached or removed, it is possible to clean with the front duct 23X and the rear duct 23Y separated. This facilitates cleaning of the inside of the drive-induced airflow guiding duct 23.

Further, because the drive-induced airflow introducing port 21a is provided below the footrest board 9, the drive-induced airflow is not disturbed as it does not strike the rider's leg. Because the brake calipers 32 are cooled with the drive-induced airflow free from such turbulence, it is possible to further improve cooling efficiency of the brake calipers 32.

Because the footrest board 9 has the tandem footrest portion 17 in its rear part located above the front part, and cosmetic side cover 21 is provided with the drive-induced airflow introducing port 21a in a position below the tandem footrest portion 17, a wide opening of the inflow port 23a of the drive-induced airflow guiding duct 23 may be secured, so as to smoothly guide the airflow below the footrest board 9 to the inflow port.

Because it is possible to locate favorably the inflow port 23a of the drive-induced airflow guiding duct 23 in the rear part of the vehicle body by providing the drive-induced airflow introducing port 21a below the tandem footrest portion 17 formed in the rear part of the footrest board 9 rather than providing the drive-induced airflow introducing port 21a below the main footrest portion 16 formed in the front part of the footrest board 9, a short length of the drive-induced airflow guiding duct 23 suffices its purpose, so that the drive-induced airflow is guided to the brake calipers 32 without its energy being baffled.

Further, because the vehicle body cover 13 is made up of the cosmetic side cover 21 formed with the drive-induced airflow introducing port 21a and the rear wheel side cover 22 covering the rear wheel brake device 8, the vehicle body cover 13 need not be formed as a single part elongate in fore-and-aft direction, but may be made in two separate parts in a favorable way for forming.

Because the drive-induced airflow guiding duct 23 is attached to the engine bracket 24 and the rear wheel side cover 25 straddling the cosmetic side cover 21 and the rear wheel side cover 22, it is unnecessary to consider connection displacement of the duct 23 due to mating surface displacement of the two, front and rear parts.

Further, because the muffler 33 is provided in the vicinity of the brake calipers 32 and the airflow delivery port 23b is open toward the muffler 33 and the brake calipers 32, it is possible to cool the muffler 33 as well as the brake calipers 32 with the drive-induced airflow.

Because the airflow delivery port 23b is open toward the underside of the vehicle body, it is possible to let the hot air, after cooling the brake calipers 32 and the muffler 33, flow smoothly from the underside of the vehicle body to the outside.

Further, because the brake calipers 32 and the muffler 33 are placed to be superposed in the vertical direction, cooling performance is maintained without increasing the vehicle width.

Because the drive-induced airflow guiding duct 23 is secured to the engine bracket 24 and the seat rail 25 through the footrest bracket 26 and the stay 27 placed in front and rear parts of the drive-induced airflow guiding duct 23, it is possible to support the weight of the drive-induced airflow guiding duct 23 elongate in fore-and-aft direction with the engine bracket 24 and the seat rail 25 in good balance. Therefore, it is possible to make it unnecessary to increase the sheet thickness of the cosmetic side cover 21 and the rear wheel side cover 22 for securing strength.

Further, because the front duct 23X is attached to the footrest bracket 26 while the rear side bracket 23Y is attached to the stay 27, it is possible to support the weight of the front duct 23X and the rear duct 23Y as divided to the footrest bracket 26, the stay 27, the engine bracket 24, and the seat rail 25, without the total weight of the drive-induced airflow guiding duct 23 concentrating on a single member. Therefore, it is possible to make the footrest bracket 26, the stay 27, the engine bracket 24, and the seat rail 25 less likely to deteriorate.

Because the footrest bracket 26 for supporting the footrest board 9 can support the drive-induced airflow guiding duct 23 as well as the footrest board 9, this part, the footrest bracket 26, can double as two parts.

While the above embodiment is described about the scooter type motorcycle 10 as a straddle-type vehicle, the vehicle may be other than the scooter type motorcycle, a scooter type motor-tricycle or scooter type four-wheeled vehicle as long as the constitution including the drive-induced airflow guiding duct 23 is employed to cool the brake calipers 32.

The invention claimed is:

1. A straddle-type vehicle comprising:
    a vehicle body frame;
    a rear wheel;
    a rear wheel brake device having brake calipers for the rear wheel; and
    a vehicle body cover surrounding the rear wheel brake device,
    wherein a drive-induced airflow introducing port is formed in the vehicle body cover,
    wherein a drive-induced airflow guiding duct is provided as a separate member from the vehicle body frame and the vehicle body cover and is supported with the vehicle body frame to guide the drive-induced airflow from the drive-induced airflow introducing port to the brake calipers of the rear wheel brake device,
    and wherein the drive-induced airflow guiding duct has an inflow port formed on its one end for the drive-induced airflow entering through the drive-induced airflow introducing port to flow in, and an airflow delivery port formed on its other end and opening in the vicinity of the brake calipers to deliver the drive-induced airflow introduced in through the inflow port to the brake calipers.

2. The straddle-type vehicle according to claim 1, wherein the drive-induced airflow guiding duct is made up of a front duct formed with the inflow port, and a rear duct formed with the airflow delivery port.

3. The straddle-type vehicle according to claim 1, wherein a footrest is provided in front of the drive-induced airflow guiding duct, and the drive-induced airflow introducing port is provided below the footrest.

4. The straddle-type vehicle according to claim 3, wherein the footrest has, in its rear part, a tandem footrest portion located above its front part, and wherein the vehicle body cover is provided with the drive-induced airflow introducing port in a position below the tandem footrest.

5. The straddle-type vehicle according to claim 4, wherein the vehicle body cover is made up of a cosmetic side cover formed with the drive-induced airflow introducing port, and a rear wheel side cover for covering the rear wheel brake device, and wherein the drive-induced airflow guiding duct is attached to the vehicle body frame so as to straddle the cosmetic side cover and the rear wheel side cover for covering the rear wheel brake device.

6. The straddle-type vehicle according to claim 1, wherein a muffler is provided in the vicinity of the brake calipers, and wherein the airflow delivery port is open toward the muffler and the brake calipers.

7. The straddle-type vehicle according to claim 6, wherein the airflow delivery port is open toward the underside bf the vehicle body frame.

8. The straddle-type vehicle according to claim 6, wherein the brake calipers and the muffler are placed one over the other in a vertical direction.

9. The straddle-type vehicle according to claim 2, wherein the drive-induced airflow guiding duct is secured to the vehicle body frame through a front part bracket and a rear part bracket placed in the front and rear parts of the drive-induced airflow guiding duct.

10. The straddle-type vehicle according to claim 9, wherein the front duct is attached to the front part bracket, and the rear duct is attached to the rear part bracket.

11. The straddle-type vehicle according to claim 9, wherein the front part bracket is a footrest bracket for supporting the footrest.

\* \* \* \* \*